FIG. I

March 25, 1952 G. WÜENSCH 2,590,745
SCREW AND NUT MECHANISM
Filed Sept. 23, 1950 2 SHEETS—SHEET 2

INVENTOR:
Guido Wuensch
BY F. D. Prager
Atty.

Patented Mar. 25, 1952

2,590,745

UNITED STATES PATENT OFFICE 2,590,745

SCREW AND NUT MECHANISM

Guido Wüensch, Berlin, Germany

Application September 23, 1950, Serial No. 186,373
In Germany October 29, 1949

9 Claims. (Cl. 74—424.8)

This invention relates to electric motor actuated, mechanical positioning means for control valves and similar regulators as used for instance in chemical process control. It relates particularly to the last or slow stage of the mechanism.

Such regulators respond to impulses derived from measuring devices, suitably transmitted and often amplified by relays. The response consists in a mechanical movement of a valve disc or similar unit. It is desirable that the movement of the considerable masses or weights incorporated in such a unit be started promptly, with the least possible delay due to acceleration loss and friction; in this respect electric motors are very satisfactory. It is also desirable that the movement of the unit be slow enough to minimize or avoid overrunning due to inertia and deceleration loss. To this end, electric motor actuators are usually combined with speed reducing gear trains. The extremely slow stages of such gear trains, required for regulators, have been less satisfactory. Therefore hydraulic or pneumatic devices, mainly a piston within a cylinder, have been used frequently for the direct actuation of control valve stems and the like; but such devices are by no means free from shortcomings. The transmission of sufficient hydraulic pressure is often expensive and cumbersome, and the transmission of sufficient pneumatic pressure is apt to involve an undesirable time lag.

I provide an improved mechanism to convert the rapid, intermittent rotation of an electric motor into slow reciprocation of the controlled unit. The improvement centers about the last stage of the speed reduction.

In this last stage velocities are extremely slow. Correspondingly the forces transmitted are high. In the past, the slowly moving parts of the drive have been subject to rapid wear and tear, since films of lubricants have been forced away from points of high pressure contact.

It has occurred to me that a certain drive principle, heretofore used for the actuation of relatively slow-moving parts in lathe equipment and the like, can be adapted to the control problem in hand. For this purpose I reverse some of the functions and features heretofore found in such lathe equipment. More particularly, I provide as a last stage of the speed reducing control mechanism a short, exteriorly screw-threaded member which is guided in straight lines, and a long, surrounding, interiorly threaded member which rotates; interposing steel balls of the type used in ball bearings between these two members in order to reduce or practically eliminate the friction of their mating surfaces.

This arrangement practically eliminates the former problem as outlined; the last stage of transmission having an extremely high rate of reduction but being free from lubrication troubles. Moreover it allows a particularly simple solution of a further problem, relating to manual actuation of the control stem at times of power failure and the like.

These and other advantages of the invention will be understood more clearly upon consideration of the detailed description of certain embodiments which follows, together with the schematic drawing, wherein:

Figure 4 shows such forces during forward rotation by the motor and Figure 5 showing such forces in reverse rotation by the motor.

Figure 1:
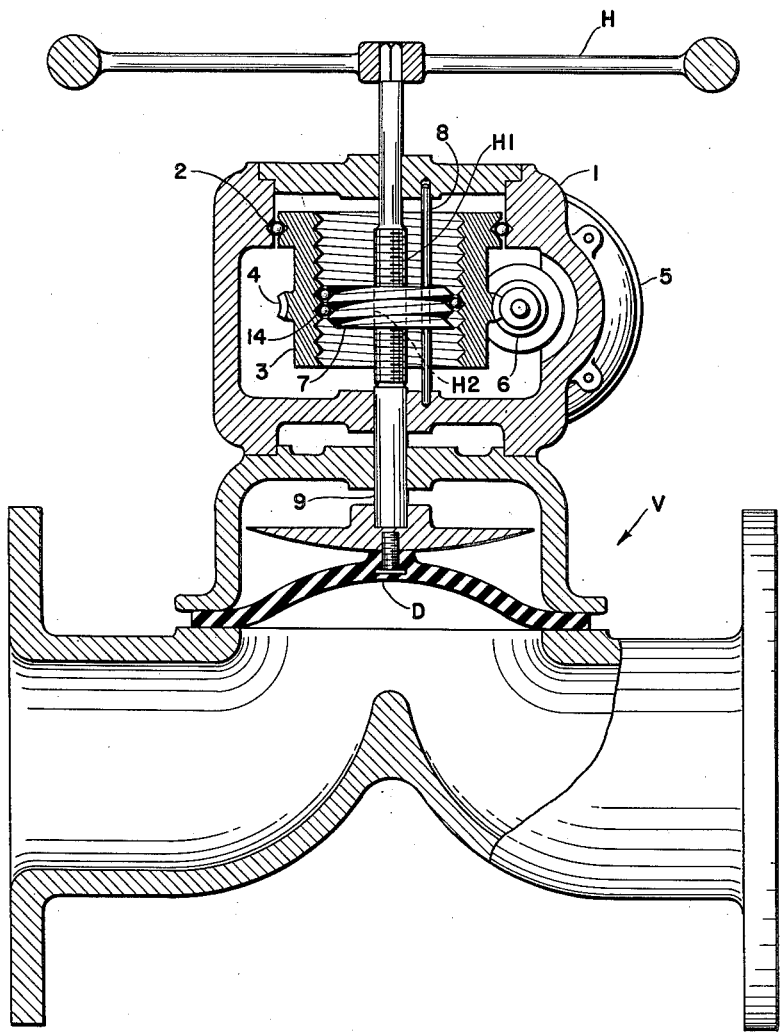
Figure 1 is a cross-sectional side elevation of a preferred embodiment.
Figure 2:
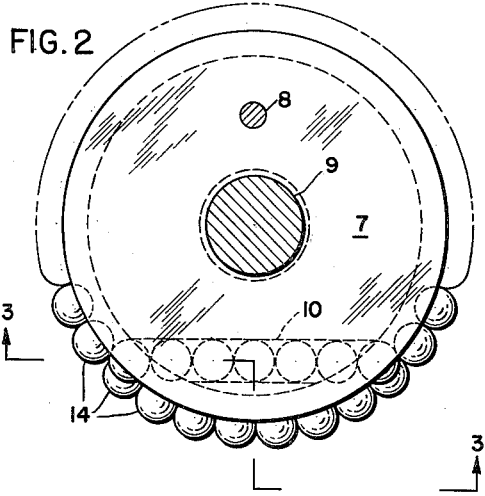
Figure 2 is a plan view of the threaded piston in the device of Figure 1.

The mechanism is shown as applied for the actuation of diaphragm D, the working part of a valve V which is to be opened or throttled to a variable extent, for control purposes. The mechanical actuating parts for the diaphragm are contained in a closed housing 1 suitably mounted on the valve and more or less filled with lubricant.

A ball bearing 2 in this housing supports and guides a rotatable, hollow, generally cylindrical member 3. The outside of this member has a worm gear 4 integrally formed thereon, which is driven by an electric motor 5 through the intermediary of a worm 6. Concentrically within the hollow cylindrical member 3 I provide a disc 7, of somewhat smaller diameter and much shorter length than the hollow space within member 3. The disc is restrained from rotation by a straight guide pin 8, suitably installed in the housing 1 and passing through the disc. The cylinder is restrained from axial motion by the bearing 2.

The members 3 and 7 have, respectively, interior and exterior screw threads, cooperating with one another through the medium of bearing balls as basically known from the aforementioned drives for lathe mechanism. However, instead of the usual lead screw, I have a relatively flat and non-rotating disc 7, and instead of the usual saddle I have a relatively long, rotary cylinder 3.

The two parts 3 and 7 have similarity with the aforementioned hydraulic or pneumatic cylinder and piston, respectively; not only in their form but in their arrangement with respect to the control unit, and their mode of operation. The valve stem 9 is directly, concentrically secured to the disc member 7. The friction of guide pin 8—not specially eliminated in the simple embodiment shown—is comparable with, or rather less than, the usual friction of the piston rings.

The steel balls interposed between members 3 and 7 form an endless series. That is, their path is closed by a channel 10 interconnecting the first thread 11 with the last thread 12 in disc 7. The channel avoids any intermediate thread or threads 13. Such a channel is easy to form by drilling through the disc 7 in an oblique direction as shown. In the aforementioned lathes and similar units a return path for the bearing balls is usually provided in the saddle or nut. I have discovered that for present purposes the mechanism is greatly simplified by utilizing the body of the disc for a plurality of purposes; that is for attachment of the valve stem 9; the guide 8 parallel to the stem; the return channel 10 interconnecting the peripheral threads; and moreover for a provision allowing manual actuation of the valve stem by a hand wheel H. This latter provision consists in screw threads H-1, H-2 formed respectively on the outside of the valve stem (integral with the hand-wheel spindle) and on the inside of the disc 7. The diameter of the disc is so selected that, between the interior and exterior threads H-2, 11, 12, 13, there is sufficient metal for the guide 8 on one side and the channel 10 on the other. The resulting relatively large pitch diameter of the short screw 7 has the further advantage that it provides for a high rate of speed reduction, even with wide screw threads and large bearing balls.

The bearing balls are shown at 14. They run in threads as mentioned, each of which has a profile substantially shaped as one half of a square, cut off along a diagonal; said diagonal being parallel to the axis of the thread. When the cylinder or nut 3 is rotated in one direction, the balls 14 are under pressure from mutually opposite sides 15, 16 of the square; when in the other direction, then from the other two sides 17, 18. The force transmitting capacity of the drive depends mainly on the number and diameter of the balls. The speed reduction depends on the inclination of the screw threads. Thus it is desirable to make room for the largest balls possible, and to space adjacent rows of balls as closely as possible. Best results are obtained with an arrangement substantially as shown, where the pitch of the threads just slightly exceeds the diameter of the balls, so that balls running in mutually adjacent threads are just barely out of contact with one another.

In operation the electric motor 5, when started by a suitable impulse, turns the long cylinder nut 3 slowly, by means of the worm gear drive 4, 6. This forces the piston screw 7, guided by pin 8, to move extremely slowly, parallel to the cylinder axis, and thereby to position the valve stem 9.

The ultimate maximum working pressure is carried by balls 14, running for instance between surfaces 15, 16, with a rolling motion, practically unaffected by the presence or breaking of a lubricant film on such surfaces. Wherever sliding friction occurs on bearing ball surfaces, the pressure is much lower, and lubricant films are intact. This is true in both directions of rotation. Accordingly the hollow cylinder 3 is able to rotate about the disc 7 without any significant friction. The worm gear drive 4, 6 stays lubricated, being relatively rapid.

The balls 14 reaching the end of the last thread 11 are returned to the first thread 12 through the cylindrical channel 10 in the piston screw 7, which has slightly larger diameter than do the balls 14. The horizontal projection of the axis of this channel is a chord, cutting off a sufficient part of the pitch diameter of the screw threads to avoid interference with the steel balls running along any intermediate thread or threads 13.

Figure 6:
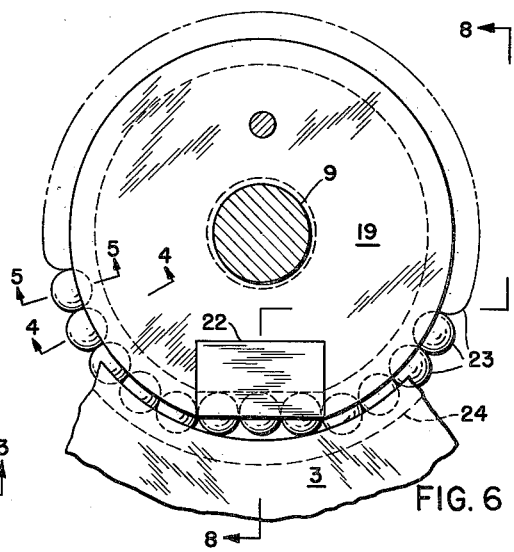
Figure 6 is a plan view, generally similar to Figure 2 but showing a threaded piston which is shorter, having only somewhat more than one complete thread instead of somewhat more than 2 complete threads as provided in Figure 3. This piston is also modified in other respects.
Figure 3:
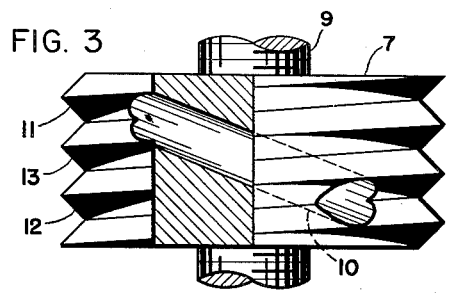
Figure 3 is an elevation of the threaded piston, partly in section, along lines 3—3 shown in Figure 2.
Figure 7:
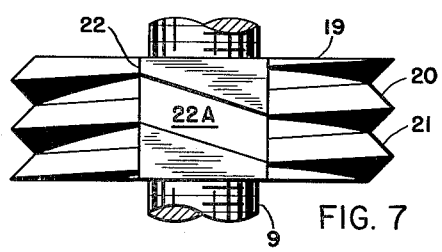
Figure 7 is an elevation of the piston in Figure 6
Figure 4:
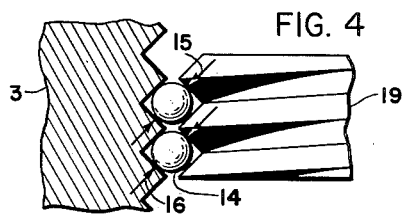
Figures 4 and 5 are diagrams showing the direction of forces acting between the working parts in the slow transmission stage of such a device.
Figure 8:
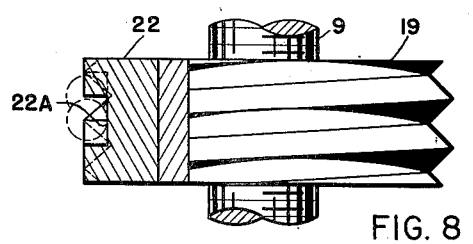
Figure 8 is a section through this piston, along lines 8—8 in Figure 6.
Figure 5:
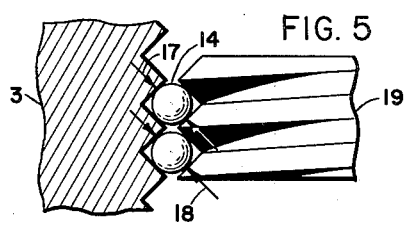

In some instances it is sufficient to provide only one more or less complete row of balls 14. It is then desirable that the arc short-circuited by the return channel be as short as possible. For this purpose the modified piston of Figures 6, 7 and 8 is provided. Here I obliquely interconnect two directly superposed thread areas 20, 21 by an open groove 22 formed on the surface of an insert 22-A in the piston 7. The horizontal projection of the axis of this groove can be a relatively short chord, with respect to the pitch diameter, since it is only necessary to avoid interference between returning balls 23 and the inner edge 24 of the screw threads formed in the cylinder 3.

It will be understood that, upon the end of the first impulse or sometimes upon the arrival of a second impulse, depending on the measuring and relaying system, not shown, the motor 5 stops running. This may happen after a few minutes, seconds or fractional seconds. Meanwhile the motor shaft and worm 6 has made several revolutions; the cylinder 3 usually has made only a partial revolution; and the piston 7, stem 9 and diaphragm D have been re-positioned by a minute vertical distance. The motion will often be reversed, repeated, and again reversed a great many times. No matter how often this may happen, the highly loaded mechanism 3, 7 is protected from serious wear and tear.

If and when it becomes necessary to re-set the valve V manually, this can now be done in the same manner as with a plain, purely manual valve. In other words, the handwheel H is turned thereby rotating the threads H-1 on the valve stem 9 through the non-rotatable manual piston 7. This operation can be performed when the motor 5 is at rest, for instance due to a power failure, routine inspection, or repair. It can also be done while the motor is operable; even while it is actually running. No such simple manual arrangement is possible in pneumatic or hydraulic piston devices, because of the loss of pressure that would be encurred through the central screw threads H-1, H-2.

Further modifications will occur to persons skilled in the art, upon consideration of this disclosure.

I claim:

1. A positioning device for a regulator such as a control valve, comprising a generally piston-shaped member; a hollow, generally cylinder-shaped member concentrically surrounding the piston member, slightly radially spaced therefrom and appreciably longer than the same; exterior and interior screw threads on the piston and cylinder members, respectively; bearing balls disposed along a substantial length of the screw threads and adapting one of said two members to rotate with respect to the other with insignificant friction; a bearing ball return channel in the piston member, interconnecting the ends of said length of the screw threads in the piston member; means to slowly rotate one of said two members and to restrain it from axial motion; means to restrain rotation of the other member, whereby the slow rotation of the rotatable member enforces an extremely slow axial motion of the non-rotatable member; and a stem secured to the non-rotatable member, adapted to position the movable part of the regulator.

2. A device according to claim 1 wherein each of said screw threads has a profile substantially shaped as one-half of a square, cut off along a diagonal; said diagonal being parallel to the axis of the member.

3. A device according to claim 2 wherein the pitch of the screw threads only slightly exceeds the diameter of the bearing balls.

4. A device according to claim 1 wherein the piston member has at least somewhat more than two complete screw threads and the return channel is a cylindrical passage of slightly larger diameter than the bearing balls extending between spaced, terminal thread portions, in the general direction of a chord cutting off a sufficient part of the pitch diameter of the screw threads, so as to avoid interference between the bearing balls in the return channel and those in intermediate thread portions.

5. A device according to claim 1 wherein the piston member has somewhat more than one complete screw thread and the return channel is an open groove having sufficient width to let the bearing balls pass and extending between slightly spaced, terminal thread portions; said groove being sufficiently recessed into the piston member to avoid interference between the bearing balls in the groove and the inside edges of the screw threads in the cylinder member.

6. A positioning device for a regulator such as a control valve comprising a housing; a piston in the housing; a stem concentrically extending through the piston, further extending through at least one wall of the housing and adapted to position the movable part of the regulator; a pin mounted in the housing, parallel to the stem and traversing the piston to restrain it from rotation; a hollow cylinder concentrically surrounding the piston, slightly radially spaced therefrom and longer than the same; exterior and interior screw threads on the piston and cylinder respectively; a bearing in the housing concentric with and supporting the cylinder; bearing balls disposed along a substantial length of the screw threads and adapting the cylinder to rotate about the piston with insignificant friction; a bearing ball return channel in the piston, interconnecting the ends of said length of the screw threads in the piston; and rotary drive means to rotate the cylinder.

7. Apparatus according to claim 6 wherein the drive means comprises a worm gear on the outside of the cylinder, a worm in mesh with the gear and an electric motor outside the housing.

8. Apparatus according to claim 7 wherein the worm gear is formed integrally with the cylinder.

9. Apparatus according to claim 6 additionally comprising a handwheel; the spindle of the handwheel being integral with the stem and being screwthreaded into and through the piston.

GUIDO WÜENSCH.

REFERENCES CITED

The following references are of record in the file of this patent:

FOREIGN PATENTS

| Number | Country | Date |
|--------|---------|------|
| 267,094 | Great Britain | May 1, 1928 |
| 699,426 | Germany | Nov. 28, 1940 |